(12) United States Patent
Fang et al.

(10) Patent No.: US 7,765,207 B2
(45) Date of Patent: Jul. 27, 2010

(54) FAST RICH APPLICATION VIEW INITIATION

(75) Inventors: Lijiang Fang, Bellevue, WA (US);
Ramesh Nagarajan, Seattle, WA (US);
Maxim Mazeev, Redmond, WA (US);
Rodger N. Kline, Bellevue, WA (US);
Yanbiao Zhao, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 976 days.

(21) Appl. No.: 11/118,531

(22) Filed: Apr. 29, 2005

(65) Prior Publication Data

US 2006/0248056 A1    Nov. 2, 2006

(51) Int. Cl.
G06F 7/00    (2006.01)
G06F 17/00   (2006.01)

(52) U.S. Cl. ...................... 707/728; 707/770
(58) Field of Classification Search ........... None
See application file for complete search history.

(56) References Cited

U.S. PATENT DOCUMENTS

| | | | |
|---|---|---|---|
| 5,701,461 A | 12/1997 | Dalal et al. | |
| 5,752,025 A | 5/1998 | Shakib et al. | |
| 5,758,337 A | 5/1998 | Hammond | |
| 5,760,770 A | 6/1998 | Bliss et al. | |
| 5,852,826 A * | 12/1998 | Graunke et al. | 707/7 |
| 6,065,012 A | 5/2000 | Balsara et al. | |
| 6,122,627 A * | 9/2000 | Carey et al. | 707/4 |
| 6,336,112 B2 * | 1/2002 | Chakrabarti et al. | 707/5 |
| 6,356,891 B1 | 3/2002 | Agrawal et al. | |
| 6,363,377 B1 * | 3/2002 | Kravets et al. | 707/4 |
| 6,366,904 B1 * | 4/2002 | BenHadda et al. | 707/3 |
| 6,457,029 B1 | 9/2002 | Switzer | |
| 6,496,828 B1 | 12/2002 | Cochrane et al. | |
| 6,510,422 B1 | 1/2003 | Galindo-Legaria | |
| 6,581,205 B1 | 6/2003 | Cochrane et al. | |
| 6,671,699 B1 | 12/2003 | Black et al. | |
| 6,714,935 B1 | 3/2004 | Delo | |
| 6,735,587 B2 | 5/2004 | Colby et al. | |
| 7,047,251 B2 | 5/2006 | Reed et al. | |
| 7,089,242 B1 * | 8/2006 | Chan et al. | 707/9 |
| 7,152,062 B1 * | 12/2006 | Draper et al. | 707/4 |
| 7,158,994 B1 | 1/2007 | Smith et al. | |

(Continued)

OTHER PUBLICATIONS

Gulutzan et al, "SQL Performance Tuning," published by Addison Wesley Professional on Sep. 10, 2002.*

(Continued)

*Primary Examiner*—Tony Mahmoudi
*Assistant Examiner*—Paul Kim
(74) *Attorney, Agent, or Firm*—Woodcock Washburn LLP

(57) ABSTRACT

To provide data from a database in response to an application query, the database is queried an initial time to provide a first set of data. For example, a "fast first page" may be requested, by requesting that all data which might appear on a first page to be displayed is obtained from the database first. After this, one or more subsequent asynchronous queries obtain the remaining information responsive to the query. Or, certain columns from the database ("spine columns") may be requested in the initial query of the database, and the rest of the data requested subsequently. Thus, information needed to make an initial presentation to a user can be obtained first, and other information filled in subsequently.

18 Claims, 4 Drawing Sheets

U.S. PATENT DOCUMENTS

| | | | |
|---|---|---|---|
| 7,162,473 | B2 | 1/2007 | Dumais et al. |
| 7,225,187 | B2 * | 5/2007 | Dumais et al. ............... 707/5 |
| 2002/0194095 | A1 | 12/2002 | Koren |
| 2004/0103147 | A1 | 5/2004 | Flesher et al. |
| 2004/0205048 | A1 | 10/2004 | Pizzo et al. |
| 2005/0033756 | A1 | 2/2005 | Kottomtharayil et al. |
| 2006/0004794 | A1 | 1/2006 | Pizzo et al. |

OTHER PUBLICATIONS

Agrawal, D. et al., "Efficient View Maintenance at Data Warehouses," SIGMOD '97, May 13-15, 1997, Tucson, Arizona, ACM, 417-427.

Bernstein, P., et al., "Context-based Prefetch - An Optimization for Implementing Objects on Relations," the VLDB Journal, Dec. 2000, Springer-Vertag, 9(3), 177-189.

Blakeley, J. et al., "Efficiently Updating Materialized Views," ACM SIGMOD '86, May 28-30, 1986, Washington Dc, 61-71.

Colby, L., et al., Algorithms for Deferred View Maintenance, ACM SIGMOD '96, Jun. 4-6, 1996, Montreal, Quebec, Canada, 469-480.

Colby, L., et al., "Supporting Multiple View Maintenance Policies," ACM SIGMOD '97, May 13-15, 1997, Tucson, Arizona, 405-427.

In the United States Patent and Trademark Office, in re.: U.S. Appl. No. 10/882,061 filed Jun. 30, 2004, Advisory Action dated Dec. 1, 2009, 3 pages.

In the United States Patent and Trademark Office, in re.: U.S. Appl. No. 10/882,061 filed Jun. 30, 2004, Final Office Action dated Sep. 13, 2007, 13 pages.

In the United States Patent and Trademark Office, in re.: U.S. Appl. No. 10/882,061 filed Jun. 30, 2004, Final Office Action dated Sep. 4, 2008, 20 pages.

In the United States Patent and Trademark Office, in re.: U.S. Appl. No. 10/882,061 filed Jun. 30, 2004, Non-Final Office Action dated Apr. 4, 2007, 12 pages.

In the United States Patent and Trademark Office, in re.: U.S. Appl. No. 10/882,061 filed Jun. 30, 2004, Non-Final Office Action dated Feb. 25, 2008, 15 pages.

In the United States Patent and Trademark Office, in re.: U.S. Appl. No. 10/882,061 filed Jun. 30, 2004, Non-Final Office Action dated May 14, 2009, 19 pages.

Lee, K.Y., et al., "Efficient Incremental View Maintenance in Data Warehouses," ACM CIKM 2001, Tenth International Conference on Information and Knowledge Management, Nov. 5-10, 2001, Atlanta, Georgia, 349-356.

Mistry et al., "Materialized View Selection and Maintenance Using Multi-Query Optimization," ACM SIGMOD 2001, May 21-24, 2001, Santa Barbara, California, 307-318.

Staudt, M., et al., "View Maintenance and Change Notification for Application Program Views,"Proceedings of the 1998 ACM symposium on Applied Computing, Feb. 27-Mar. 1, 1998, Atlanta, Georgia, 220-225.

Zhang, X. et al., "Parallel Multi-Source View Maintenance," the VLDB Journal, Springer-Vertag, Jan., 2004, 13(1), 22-48.

* cited by examiner

FAST RICH APPLICATION VIEW INITIATION

CROSS-REFERENCE TO RELATED APPLICATIONS

The subject matter described herein is related to the subject matter disclosed in application Ser. No. 10/882,061 filed on Jun. 30, 2004 entitled "Rich Application View System and Method" which is hereby incorporated by reference.

FIELD OF THE INVENTION

The present invention relates generally to computers and more particularly toward facilitating rich interactions between applications and stored data, the field of information storage and retrieval, and, more particularly, to the presentation of results from storage.

BACKGROUND OF THE INVENTION

Data processing systems are well known in the art. Conventionally, large amounts of data are stored in relational databases. Relational databases organize data into a plurality of tables and include mechanisms to facilitate efficient querying, retrieving, and data processing. In particular, tables are partitioned into rows and columns such that a value exists at the intersection of each row and column. Each column typically contains values of the same data type. For instance, a sales table can consist of columns for the name of the purchaser, the product name, the price, the location, etc. The rows contain values for each of these columns. Data can be retrieved from and provided to tables utilizing structured query language (SQL) statements to communicate with a database server management system (e.g. relational database management system (RDMS)). Accordingly, one can specify a query and receive a set of results in response thereto (e.g., a table of sales data). When the database is quite substantial in size, such processing of data is often referred to as on-line transactional processing (OLTP). For instance, airlines and hotels can utilize OLTP to process reservations and banks as well as automated teller machines (ATMs) can utilize OLTP for electronic fund transfers.

There are several keys to optimizing conventional database transactions. First, queries must be satisfied quickly without blocking others from accessing data. Relational databases are typically set up and utilized by a myriad of people. Hence, when data is being accessed from a database to satisfy a query or otherwise execute a SQL instruction, the database is locked to guarantee data integrity. In other words, concurrent users of the data must wait to execute their queries until the current action is terminated. Accordingly, it is desirable to execute queries expeditiously to minimize others waiting period. Second, the database must provide a reasonable size of data back to the user as soon as possible so that something can be done with it. For instance, one might query a database to generate a report, perform some calculation or other data processing. In essence, conventional data processing consists of getting in and out of the database as fast as possible to ensure its availability to others.

By contrast, applications require very rich interactions with data. For example, in a typical email application, users desired to scroll up and down through data as well as jump to and from different points in the data. Furthermore, users desire to group related data and sort based on the data members and the grouping of databases. Still further yet, users desire to interact with such data in a very live an interactive fashion. Thus, there is a tension between applications and shared data. That is, applications desire to interact very richly with the data while stores require very well defined interactions with the data that are very strictly scoped in terms of time and amount of data. This can become particularly problematic when confronted with a large amount of data or a potentially large amount of data. Conventionally, what an application will do to enable a user to scroll over say twenty different records is that it will query those records, store them on the client, and then release the database connection. The user can then scroll through the data on the client. Additionally, the user can make changes to the data on the client and then possibly push those changes back to the database. Unfortunately, the conventional paradigm breaks down when you have large amounts of data in part because it is not desirous to have to cache large amounts of data on a client machine. For example, if a user executes a query or search and receives 15,000 hits, it is quite inefficient and unreasonable to read and store all 15,000 hits onto the client's machine before allowing them to scroll through the first three or four that might be of the most interest. In such a case, it might be predictable which data will be of interest, namely the first three or four. However, in other applications, such as email, one could be interested in any data throughout the entire result set. For example, one might specify a query to show all email where certain conditions are met (e.g., received is me). In that case, the user will want to scroll through all the data, but they will not want to store it all on their client device.

Moreover, users want the interaction with data to be very live (e.g., in real-time) so as changes happen they are reflected in the data. For instance, if new data arrives they want to see that data and as data is deleted they want to see such data removed. For instance, when an email goes from the state of unread to read, the displayed mail should go from bolded to un-bolded almost instantaneously. Also, as new mail comes into a user mailbox they want to see it appear. These and other types of rich applications are not supported well by relational databases.

In order to allow rich applications to work in concert with relational databases, as described more fully below, application views are used to provide rich interaction with persisted data. In particular, an application view is generated for each application and dynamically maintained to provide a rich experience working with data, including but not limited to an ability to scroll through large sets of data while viewing additions, deletions, and other changes made to the underlying data in real-time.

In one implementation, rich applications define the set of results to be maintained for use by the application by specifying:
  the source,
  the set of projected columns or expressions, and
  filters, sorts, aggregations and groupings.

This may be done by creating ViewDefinition objects and setting properties on such objects, but other means of expressing these query components, including, e.g. parsing a query syntax, are equally valid.

In order to support rich views over these results, in one implementation, temporary tables are generated populated with the results of the query. Populating these temp tables can be a data intensive and long running query depending on the specification of the query supplied. As a result the initial load time will adversely impact the time from the creation of the view to when results are available to the application. Extensive performance analysis has revealed that the initial population of the view is the main hotspot and bottleneck in terms of performance and where the majority of the processing time takes place during the lifetime of the view.

Thus, a user may experience a delay during the use of an application with a rich application view. Such a delay may adversely affect the user experience.

In view of the foregoing, there is a need for systems and methods that overcome such deficiencies.

SUMMARY OF THE INVENTION

In order to populate an application view with data from a database needed by an application, at least two separate requests are made. First, an initial query is calculated to provide a first set of data.

Certain columns from the database ("spine columns") may be requested in the initial query of the database, and the rest of the data ("non-spine" or "delay load" columns) are then requested subsequently or asynchronously and in the background. This allows applications which initially need only certain data from the request to provide faster initial response to users after an application view request.

In another optimization a "fast first page" may be requested, requesting that all data which might appear on a first page or first pages to be displayed be obtained from the database first. After this (or asynchronously and in the background), one or more subsequent queries obtain the remaining information responsive to the query. Thus, information needed to make an initial presentation to a user can be obtained first, and other information filled in subsequently. Other features and advantages of the invention may become apparent from the following detailed description of the invention and accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
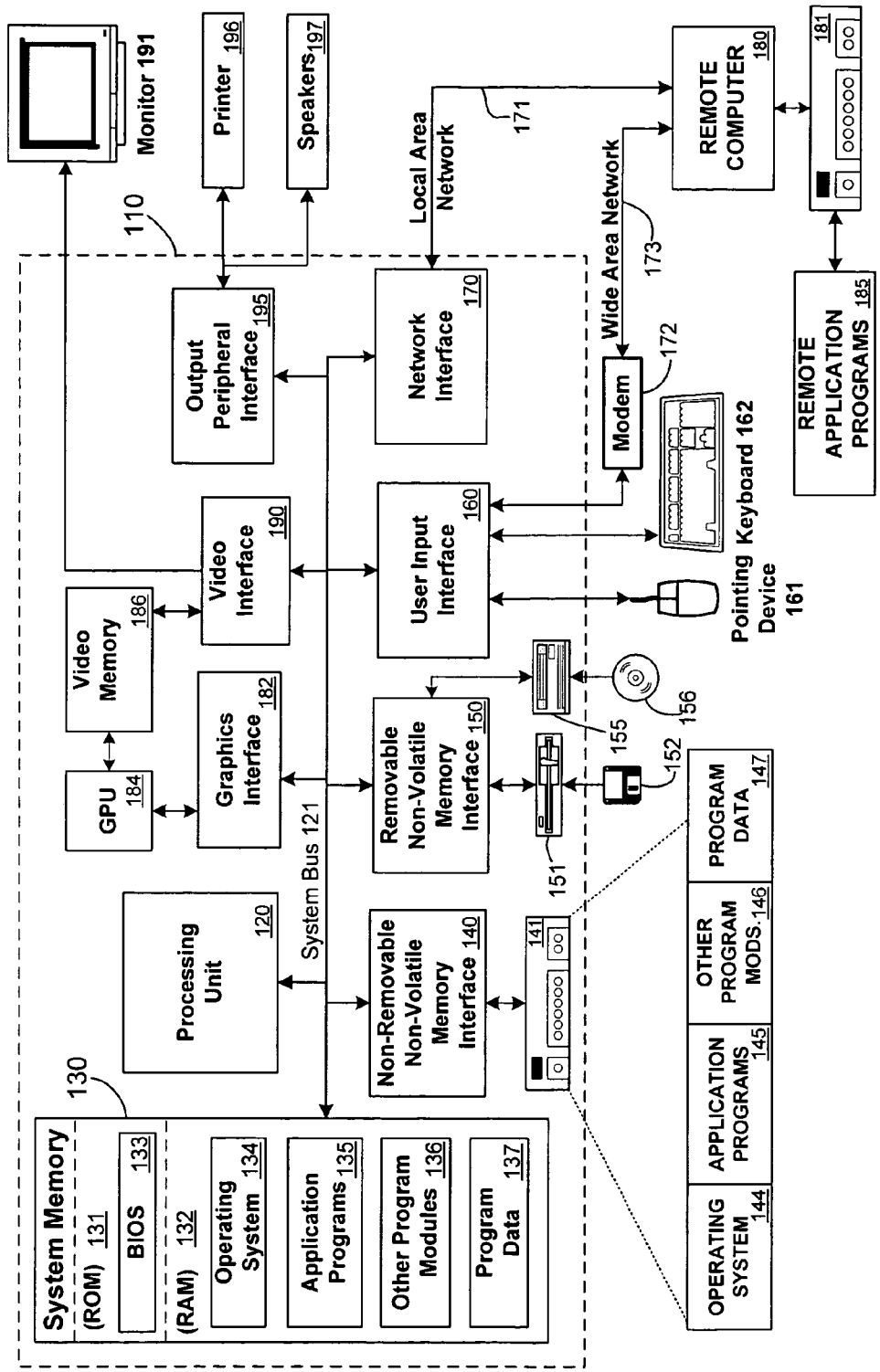
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Application Views

Applications which require rich interactions with data stored in a database may be provided with such data via an intermediary system. For instance, commonly-assigned co-pending U.S. patent application Ser. No. 10/882,061, entitled "Rich Application View System and Method," filed Jun. 30, 2004 describes such a system.

Figure 2:
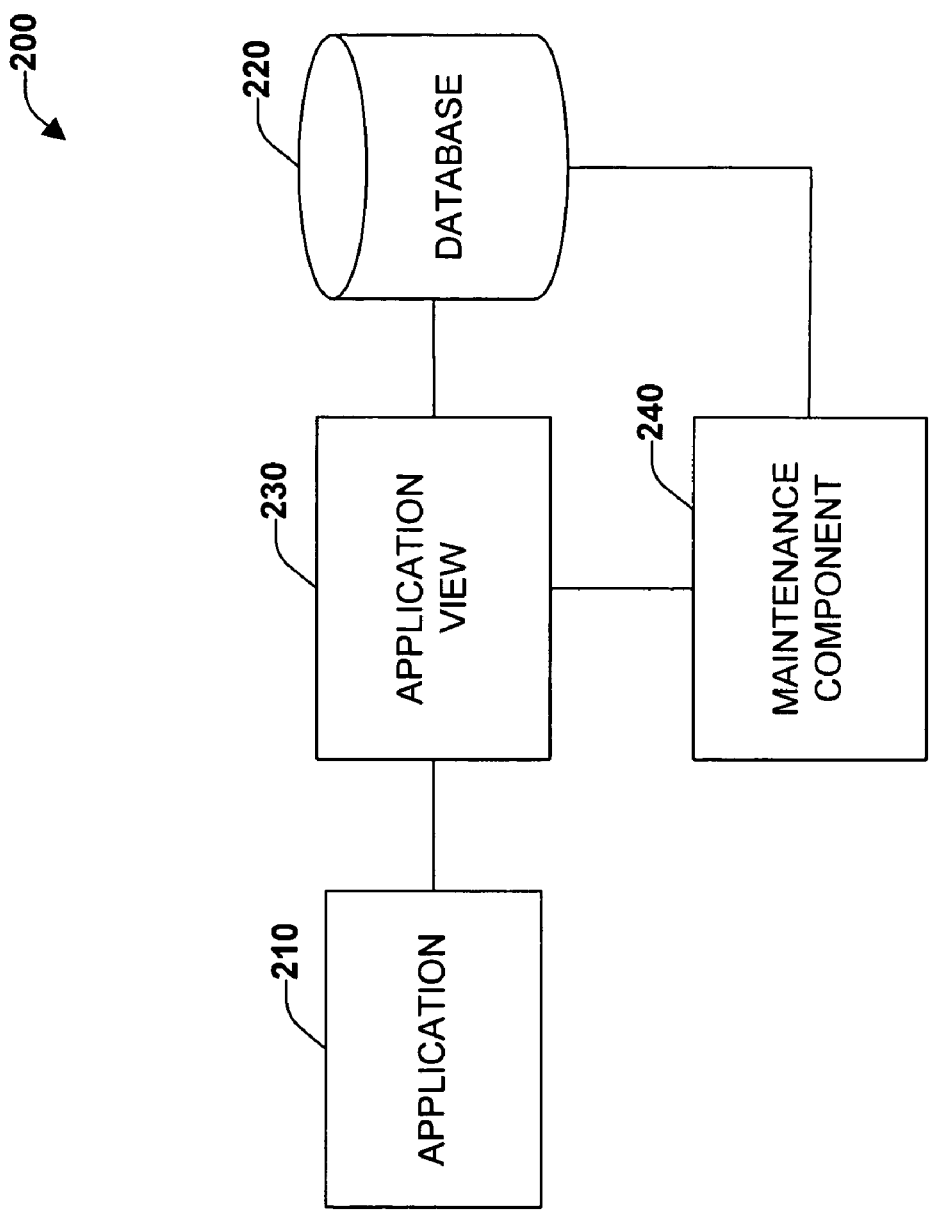
FIG. 2 is a block diagram of a rich application support system according to one embodiment of the invention.

FIG. 2 is a block diagram of a rich application support system 200 in accordance with an aspect of the subject invention. System 2100 comprises application 210, database 220, application view 230 and maintenance component 240. Application 210 is an end user program that engages computer machinery via instructions to perform some useful function (e.g., email, file organization . . . ). Database 220 is a combination of hardware and software that facilitates data persistence and retrieval. Accordingly, database 220 can also be referred to as a database management system (DBMS) that provides mechanisms for efficiently entering, organizing, querying, and retrieving data.

In accordance with one aspect of the invention, database 220 can be a relational database, which stores and organizes data in formally defined tables. However, the subject invention also contemplates employment of other types of databases including but not limited to a multidimensional database. According to an aspect of the invention, application 210 is rich in the sense that it requires continuous and live interaction with database 220 data rather than quickly connecting to and disconnecting therefrom. Application view 230 can act as an intermediary between an application 210 and database 220 by housing (e.g., storing, caching . . . ) a subset of data with which an application and ultimately a user desire to richly interact. Maintenance component 240 ensures that the application view 230 is synchronized with the database 220, such that relevant view data is updated to correspond to any changes (e.g., add, delete, update) in the database 220.

Application view 230 holds a subset of database information that can be queried against by a user or application 210. The view 230 can be created by specifying a view definition. The view definition can be a particular query itself that upon execution returns a result set of database data that can be utilized as an application view 230. Application view 230 can be, for example, a temporary or virtual table, which can be queried against rather than base tables of a relational database. Although it is perfectly feasible for the view to be embodied as temporary table, it should also be appreciated that the view can also be a regular persisted table stored on the database 220. This enables the view to be sustained across user sessions or applications instances. With a temporary table, the view can be destroyed upon termination of a user or application session. In either case, interaction with database data is optimized (e.g., less trips to the database) at the expense of the time (e.g., few seconds) that it takes to initially materialize a view.

It should further be appreciated that the view does not necessarily need to be materialized and held in memory or persisted to a store. Instead, the view definition can be passed together with a user or application query to be executed by a database 220 query processor. This can significantly increase the scalability of the system 200. However, there is a tradeoff. In particular, improved scalability can come at the cost of reduced responsiveness or liveliness as query processing will take longer than if the view was materialized and queries executed thereon.

It should also be noted and appreciated that application view(s) 230 are significantly different from other conventional database views. In particular, application views 230 are customized or personalized for each user or application instance (e.g., email application). By contrast, conventional views are general and created for employment by a plurality of different users. However, it should be appreciated that application views can be provided to and used by multiple users in a similar yet unique manner. In fact, database views could be employed to facilitate generation of application views. Application views 230 are also much more dynamic than any known database view. For instance, a user may continually change the view definition, which is not conventionally done. Furthermore, the application view definition can be much more complicated than what conventional databases support today. For example, application views 230 can have expanded and collapsed items within a grouping level (described in detail infra). Additionally, any changes made to relevant underlying stored data are perpetuated to the application view 230 as changes are made to the store (i.e., in real time) or very nearly thereafter.

Rich Application View Initiation

As discussed above, interaction with database data is optimized (e.g., less trips to the database) at the expense of the time (e.g., few seconds) that it takes to initially materialize a view. In order to improve such view initiation, instead of a single query to retrieve data for an application view 230, at least two queries are made to database 220, as described herein. In one embodiment of the invention, the improved view initiation is optional, and an application can also optionally decide to issue only one query and initiate the view according to prior art techniques.

In one embodiment, the application view 230 provides a view to the application 210 and is operably connected to the database 220. A view query is accepted from application 210. The view query may be a query, or may be some other means of defining the application view 230 required, such as an object (e.g. the ViewDefinition object described above) or otherwise. A preliminary query relating to the view query is then issued to the database 220. The responsive data is stored within the application view 230 for provision to the application 210. In one embodiment, at least one additional query is then issued by application view 230 to database 220 in order to obtain the remaining results. In some embodiments, the preliminary query is an asynchronous query. The additional query or queries are asynchronous background queries.

The initial query is directed toward obtaining the data needed initially for the application. Thus, as described below, where the database 220 stores columns of data, for example with multiple columns corresponding to each entry (or row), then only certain selected columns ("spine columns") for each of the rows responsive to the query may be obtained for the application view 230 according to the preliminary query to the database 220. Subsequently, additional columns responsive to the query may be obtained. Thus, if the application 210 is a mail application, and only sender, recipient, subject and date information is needed for a view of mail in a folder, when the application view 230 is requested to obtain information for that folder, the spine columns containing sender, recipient, subject and date information are obtained first, according to the preliminary query. Additional information residing in additional columns in the database 220 is then obtained.

Spine Columns

As described above, the spine query optimization allows the application to specify columns that are to be used first by an application. These columns should be those that generally have to be visible and constitute the core information of a view. The other columns ("non-spine" or "delay load" columns) that have information are loaded asynchronously once the initial view has been created.

The rich application view functionality allows a distinction to be made between spine and non-spine types of columns through the ViewDefinition of application view 230 (where, as described above, the application view 230 is created through a ViewDefinition or similar object) or, where application view 230 is created through a query, the distinction may be made in a query. Generally, the distinction between spine and non-spine columns is not limited to being transmitted in a ViewDefinition or similar object, or in the query that creates application view 230. Any way for the application view 230 to receive data regarding spine columns or to determine which columns should be treated as spine columns is contemplated.

In one embodiment, the default when adding a field to the ViewDefinition is for it to be a spine column, and spine columns are the only columns that can be initially (re)sorted, (re)sectioned and filtered by in application view 230. The view will indicate that it is an illegal operation to refer to the non-spine columns in calls to methods in the application view 230 prior to the application view 230 being fully loaded. In one embodiment, the view will fire an event when the temporary table has been fully populated. Prior to this event no re-sectioning, re-sorting or filtering can be performed on the application view 230. Following this event the application view 230 is fully operational and all dynamic modifications of the view such as adding fields, sorting, re-sectioning, and filtering etc. can be performed.

Figure 3:
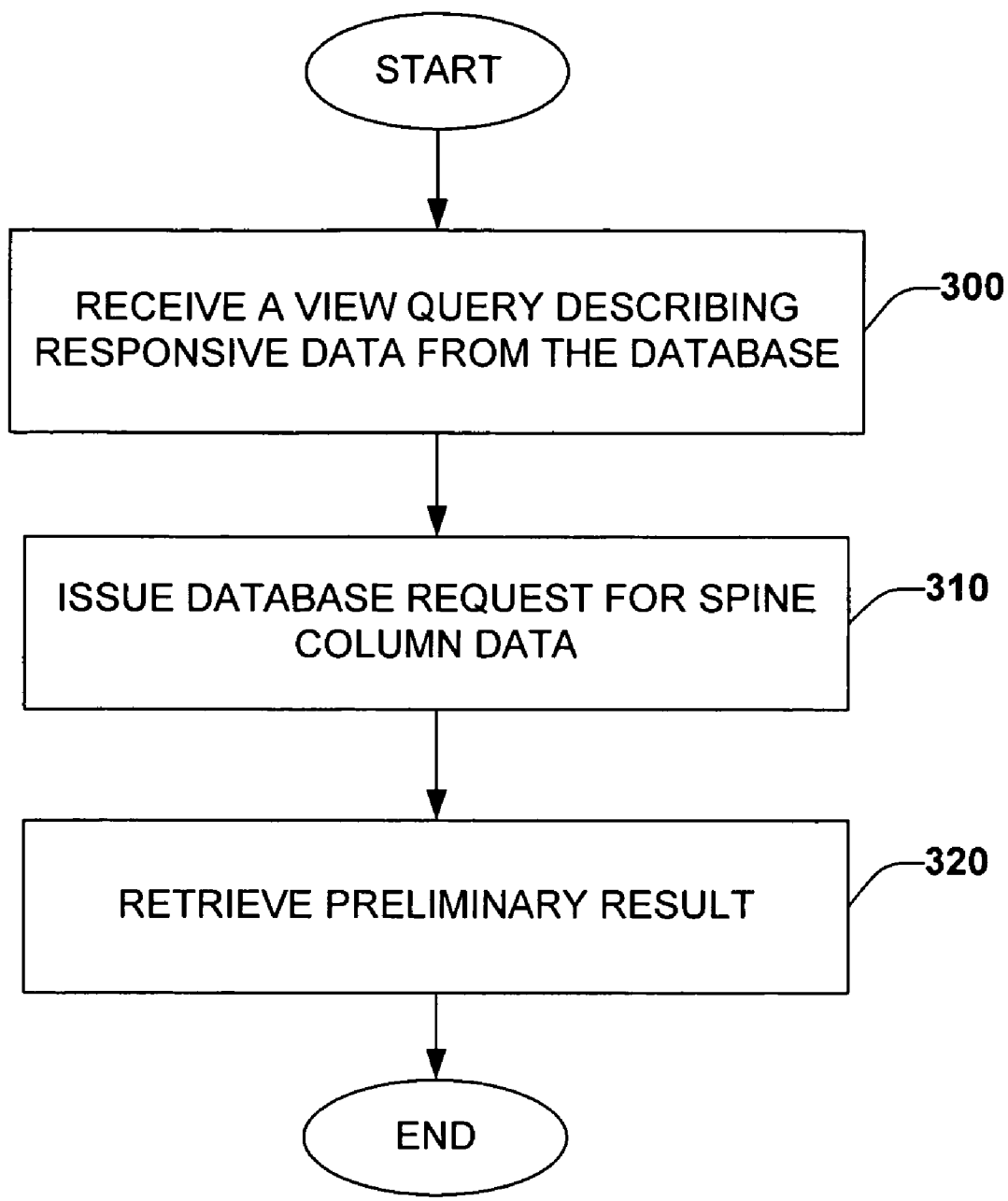
FIG. 3 is a flow diagram of a method for providing application view data with spine column optimization according to one embodiment of the invention.

FIG. 3 is a flow diagram describing the spine column optimization according to one embodiment of the invention. As shown in FIG. 3, providing data from a database is provided in response to a query is accomplished by, first, in step 300, receiving a view query comprising a description of responsive data to return from said database. As discussed above, this may be via the creation of an object such as a ViewDescription object. This may also occur via a query, such as a query in a specific application view query syntax. Any means of expressing that certain data from a database is requested is contemplated. In step 310, a database query is issued to a database, based on the view query, calculated to retrieve responsive data for specific (spine) columns. In step 320, a preliminary result is retrieved for the database query. Asynchronously and in the background during steps 310 and 320, one or more additional queries may be issued in order to retrieve data for the non-spine (delay load) columns.

Fast First Page

Fast first page is a performance optimization that is used to quickly return the first results needed for an application while still building the complete application view 230 on a background thread. The fast first page optimization populates the application view 230 with initial page or pages (a "fast first page") of results for the application while asynchronously populating the application view 230 with the rest of the results. In one embodiment, the number of pages returned can be specified by the user. This allows the application to quickly display results to the user or process them as appropriate. During the call to create the view a number of queries are issued—first, a query to return the results for the fast first page and then one or more asynchronous background queries to populate the application view 230. As discussed below, this may be combined with the spine column optimization.

In one embodiment, the mechanics of the fast first page optimization are hidden from the application. The application will only be able to discern that the fast first page is occurring because the value for the count of records in the application view 230 will match the number of records returned by the first query (which retrieves the "fast first page(s)") and will automatically increase appropriately as the temporary table is fully populated by the additional query(s).

In order to determine which results will be included in the fast first page, an ordering will be contained in or implicit in the request which establishes the application view 230. One way in which this can be accomplished is by means of TOP and ORDER-BY clauses in a request. Thus, for example, a fast first page query may request the TOP n records, ordered in a way specified by the ORDER-BY request.

In one embodiment, the structure of the records returned by the fast first page query will be the same as those returned from the additional query(s). Note however, the values of the records returned by the Fast First Page may be different to those in the temporary table (due to changes in the store); these changes will be managed through notification functionality that the application view 230 provides.

The view will fire an event when the temporary table has been fully populated. Prior to this event no re-sectioning/sorting/filtering can be performed on the view. Following this event the view is fully operational and all dynamic modifications of the view such as adding fields, sorting/re-sectioning/filtering etc. can be performed.

Figure 4:
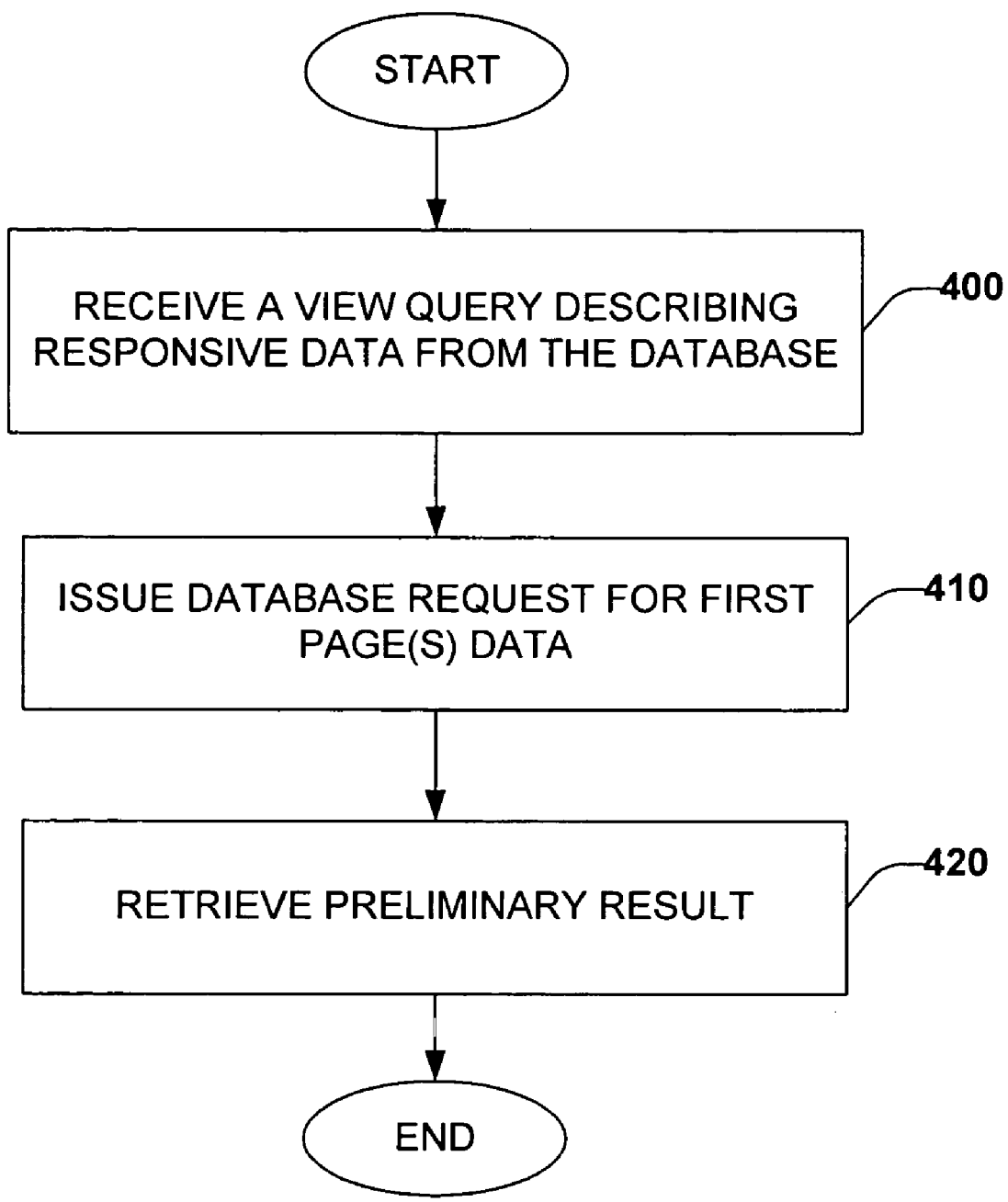
FIG. 4 is a flow diagram of a method for providing application view data with fast first page optimization according to one embodiment of the invention.

FIG. 4 is a flow diagram describing the fast first page optimization according to one embodiment of the invention. As shown in FIG. 4, providing data from a database is provided in response to a query is accomplished by, first, in step 400, receiving a view query comprising a description of responsive data to return from said database. Again, the view query may be received via the creation of an object such as a ViewDefinition object. Step 400 may also occur via a query, such as a query in a specific application view query syntax. Any means of expressing that certain data from a database is requested is contemplated. Because a fast first page must obtain the first page or first pages of responsive data in an order required by the application, an ordering is also received in the view query or is inherent in the view query.

In step 410, a database query is issued to a database, based on the view query, calculated to retrieve the first page or pages of responsive data. In step 420, a preliminary result is retrieved for the database query. Asynchronously and in the background during steps 410 and 420, one or more additional queries may be issued in order to retrieve data not part of the first page or pages.

Spine Optimization with Fast First Page Optimization

The spine and fast first page optimizations may be used together to provide the richest user experience during the creation of the view and reduce the inherent bottlenecks thereof. In one embodiment, the order of processing during creation time of the application view 230 is as follows:

Return the initial pages of results using the Fast First Page mechanism

Retrieve spine columns for the remaining results

Complete the application view with the non-spine columns.

Table 1 includes an example of how the spine optimization and fast first page optimization may be implemented:

TABLE 1

```
1.    //Create my context
2.    StorageContext ctx = new StorageContext (@"\\localhost\DefaultStore\");
3.    //create a searcher over Persons
4.    StorageSearcher<PersonItem> searcher = ctx.Items.FilterByType<PersonItem>( );
5.    //specify a new view definition to shape the view
6.    StorageViewDefinition definition = new StorageViewDefinition( );
7.    //add fields
8.    definition.Fields = "ItemId, DisplayName, Birthdate, Gender";
9.    //create a StorageViewOptions and specify the delay load columns
10.   StorageViewOptions options = new StorageViewOptions( );
11.   options.DelayLoadFields = "Birthdate, Gender";
12.   //Sorting can be done on spine columns
13.   definition.Sort = "DisplayName asc";
14.   //Specify page size (can be used to determine number of records to return in
          the "fast first page").
15.   definition.PageSize = 50;
16.   //create the view
17.   //Birthdate and Gender will be loaded asynchronously.
18.   //The CreateView call will return once the table has been initially populated
          with the ItemId and DisplayName values for the query.
```

TABLE 1-continued

```
19.    StorageView<StorageViewRecord> view = searcher.CreateView(definition, options);
20.    //enumerate the results
21.    foreach (StorageViewRecord record in view)
22.    {
23.    ...
24.    }
```

The above code example illustrates one possible way of defining an application view with the use of an object to define the shape of the results. The Person data set is being searched to retrieve items from that data set. Line 8 defines the set of fields to requested from the Person data set to be retrieved from the database that will be used by the application. In line 11 the constituents of the data set that are not core to the result (the non-spine of delay load fields) are specified. Line 13 specifies that the sorting will be done on DisplayName, with the sort in ascending order. In line 15 a page size is specified. This page size could be used by the implementation to determine how many records should be returned as part of the "fast first page".

This definition is then fed into the creation of the view which will return the first page (50 records) with only the ItemId and DisplayName populated on each row, while asynchronously and in the background complete the population of the application view. Sorting cannot be done on delay load columns, until they have been loaded into the view and the load complete event has fired. In the above example, if we replace line 13 with the following, an exception will be thrown when the CreateView statement is called on line 19:

definition.Sort="Birthdate asc";

Because Birthdate is a delay load column, it can not be the column on which records are sorted.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

Although the above code example details one embodiment of the invention implemented in the C# programming language, no limitation to the C# programming language for implementing the invention is intended. The invention may be implemented in other ways, for example, without limitation, SQL (structured query language) or other programming languages.

What is claimed:

1. A system for servicing data requests from an application, said system comprising:

at least one computer comprising a database storing data, wherein the data is stored according to a schema comprising a plurality of tables, each table comprising a column;

a view provider, operably connected to said database, said view provider adapted to:

receive an initial query from an application, wherein the initial query includes a view definition defining an application view, the application view comprising a complete set of pages to be retrieved from the database, wherein the view definition comprises a preliminary query and specifies how to order the complete set of pages in the application view and a number N of initial pages, each page in the complete set of pages including a plurality of columns of data, the view definition further specifying at least one spine column and one at least one non-spine column from among the plurality of columns of data, each spine column in a page being deemed to constitute core information in the page that should be displayed relatively sooner than non-core information and each non-spine column in a page being deemed to constitute non-core information that should be displayed relatively later than core information;

generate an application view from the view definition, wherein the application view provides a container for storing a subset of information from the database commensurate with the view definition;

based upon the view definition, formulate a first query, wherein the first query is designed to retrieve a predefined initial set of pages comprising the first N pages from the complete set of pages as ordered according to the order specified by the view definition;

submit the first query to the database;

receive first response data from the database relating to the first query;

store the first response data in the application view;

generate a display based upon the first response data;

after generating the display based upon the first response data, formulate a second query, wherein the second query is designed to retrieve a first portion of each of a remaining set of pages, the remaining set of pages comprising all the pages after the first N pages from the complete set of pages as ordered according to the order specified by the view definition, the retrieved first portion of each of the remaining set of pages comprising data from the database relating to each spine column specified in the view definition;

submit the second query to the database;

receive second response data from the database relating to the second query;

store the second response data in the application view;

update the display based upon the application view with the second response data;

after updating the display based upon the application view with the second response data, based upon the view definition, formulate a third query, wherein the third query is designed to retrieve a second portion of each of the remaining set of pages, the retrieved second portion of each of the remaining set of pages comprising data from the database relating to each non-spine column specified in the view definition;

submit the third query to the database;

receive third response data from the database relating to the third query;

store the third response data in the application view;

update the display based upon the application view with the third response data, wherein the second and third queries and associated updating of the display are performed asynchronously, wherein an event is fired upon completion of updating the application view with the second response data and upon an attempt to sort data associated with a particular spine column before the event is fired, an indication of an illegal operation is generated.

2. The system of claim 1, wherein the initial query is directed toward obtaining data that is initially needed by the application.

3. The system of claim 1, where said database stores data in at least two columns, and where said second query comprises a query requesting data from one or more specific columns from among said at least two columns of data.

4. The system of claim 3, wherein the predefined initial set of pages are defined by a TOP clause and an ORDER-BY clause.

5. The system of claim 1, where said second and third queries are issued as background queries.

6. The system of claim 4, where said initial query comprises ordering data describing an ordering for responsive data to said initial query, and where said first query is calculated to retrieve a sequentially first grouping of data from among said first response data when said first response data is ordered according to said ordering data.

7. The system of claim 4, wherein the first query requests the TOP n records ordered in a manner specified in the ORDER-BY clause.

8. The system of claim 6, wherein the second and third queries and associated updating of the application view are respectively performed by a first background thread and a second background thread.

9. A computer implemented method for servicing data requests for a database storing data according to a schema, the schema comprising a plurality of tables, each table comprising a column from an application comprising:

receive an initial query from an application, wherein the initial query includes a view definition defining an application view, the application view comprising a complete set of pages to be retrieved from the database, wherein the view definition comprises a preliminary query and specifies how to order the complete set of pages in the application view and a number N of initial pages, each page in the complete set of pages including a plurality of columns of data, the view definition further specifying at least one spine column and one at least one non-spine column from among the plurality of columns of data, each spine column in a page being deemed to constitute core information in the page that should be displayed relatively sooner than non-core information and each non-spine column in a page being deemed to constitute non-core information that should be displayed relatively later than core information, wherein each spine column pertains to a database column designated to be viewable in an initial view and each non-spine column pertains to a database column designated to be viewable in a subsequent view;

generating, via the computer, an application view from the view definition, wherein the application view provides a container for storing a subset of information from the database commensurate with the view definition;

based upon the view definition, formulating a first query, wherein the first query is designed to retrieve a predefined initial set of pages comprising the first N pages from the complete set of pages as ordered according to the order specified by the view definition;

submitting the first query to the database;

receiving first response data from the database relating to the first query;

storing the first responsive data in the application view;

generating a display based upon the first response data;

after generating the display based upon the first response data, formulating a second query, wherein the second query is designed to retrieve a first portion of each of a remaining set of pages, the remaining set of pages comprising all the pages after the first N pages from the complete set of pages as ordered according to the order specified by the view definition, the retrieved first portion of each of the remaining set of pages comprising data from the database relating to each spine column specified in the view definition;

submitting the second query to the database;

receiving second response data from the database relating to the second query;

storing the second response data in the application view;

updating the display based upon the application view with the second response data.

10. The method of claim 9, further comprising:

based upon the view definition, formulating a third query, wherein the third query is designed to retrieve data from the database relating to each non-spine column specified in the view definition;

submitting the third query to the database;

receiving third response data from the database relating to the third query;

storing the third response data in the application view;

updating the display based upon the application view, wherein the second and third queries and associated updating of the display are performed asynchronously.

11. The method of claim 9, wherein the initial query is directed toward obtaining data that is initially needed by the application.

12. The method of claim 9, where the database stores data in at least two columns, and where said second query comprises a query requesting data from one or more specific columns from among said at least two columns of data.

13. The method of claim 9, wherein the predefined initial set of pages are defined by a TOP clause and an ORDER-BY clause.

14. The method of claim 10, where said second and third queries are issued as background queries.

15. A computer readable storage medium for servicing data requests to a database, the database storing data according to a schema, the schema comprising a plurality of tables, each table comprising a column from an application comprising, the computer readable medium having stored thereon instructions for:

receive an initial query from an application, wherein the initial query includes a view definition defining an application view, the application view comprising a complete set of pages to be retrieved from the database, wherein the view definition comprises a preliminary query and specifies how to order the complete set of pages in the application view and a number N of initial pages, each page in the complete set of pages including a plurality of columns of data, the view definition further specifying at least one spine column and one at least one non-spine column from among the plurality of columns of data, each spine column in a page being deemed to constitute core information in the page that should be displayed relatively sooner than non-core information and each non-spine column in a page being deemed to constitute non-core information that should be displayed relatively later than core information, wherein each spine column pertains to a database column designated to be viewable in an initial view and each non-spine column pertains to a database column designated to be viewable in a subsequent view;

generating an application view from the view definition, wherein the application view provides a container for storing a subset of information from the database commensurate with the view definition;

based upon the view definition, formulating a first query, wherein the first query is designed to retrieve a predefined initial set of pages comprising the first N pages from the complete set of pages as ordered according to the order specified by the view definition;

submitting the first query to the database;

receiving first response data from the database relating to the first query;

storing the first responsive data in the application view;

generating a display based upon the first response data;

after generating the display based upon the first response data, formulating a second query, wherein the second query is designed to retrieve a first portion of each of a remaining set of pages, the remaining set of pages comprising all the pages after the first N pages from the complete set of pages as ordered according to the order specified by the view definition, the retrieved first portion of each of the remaining set of pages comprising data from the database relating to each spine column specified in the view definition;

submitting the second query to the database;

receiving second response data from the database relating to the second query;

storing the second response data in the application view;

updating the display based upon the application view with the second response data.

16. The computer readable storage medium of claim 15, further comprising instructions for:

based upon the view definition, formulating a third query, wherein the third query is designed to retrieve data from the database relating to the non-spine columns specified in the view definition;

submitting the third query to the database;

receiving third response data from the database relating to the third query;

storing the third response data in the application view;

updating the display based upon the application view, wherein the second and third queries and associated updating of the display are performed asynchronously.

17. The computer readable storage medium of claim 15, wherein the initial query is directed toward obtaining data that is initially needed by the application.

18. The computer readable storage medium of claim 17, where the database stores data in at least two columns, and where said second query comprises a query requesting data from one or more specific columns from among said at least two columns of data.

* * * * *